US012505569B2

(12) United States Patent
Jeong et al.

(10) Patent No.: US 12,505,569 B2
(45) Date of Patent: Dec. 23, 2025

(54) DISPARITY-BASED DEPTH REFINEMENT USING CONFIDENCE INFORMATION AND STEREOSCOPIC DEPTH INFORMATION

(71) Applicant: QUALCOMM Incorporated, San Diego, CA (US)

(72) Inventors: Jisoo Jeong, San Diego, CA (US); Hong Cai, San Diego, CA (US); Risheek Garrepalli, San Diego, CA (US); Fatih Murat Porikli, San Diego, CA (US); Mathew Sam, San Diego, CA (US); Khalid Tahboub, San Diego, CA (US); Bing Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/327,380

(22) Filed: Jun. 1, 2023

(65) Prior Publication Data
US 2024/0404093 A1    Dec. 5, 2024

(51) Int. Cl.
*G06T 7/593*    (2017.01)
(52) U.S. Cl.
CPC .... *G06T 7/593* (2017.01); *G06T 2207/20084* (2013.01); *G06T 2207/20212* (2013.01)
(58) Field of Classification Search
None
See application file for complete search history.

(56) References Cited

U.S. PATENT DOCUMENTS

| 11,080,590 | B2 * | 8/2021 | Smolyanskiy | G06T 7/593 |
| 2010/0007720 | A1 * | 1/2010 | Murali | G06T 7/97 |
| | | | | 348/E13.001 |
| 2012/0249746 | A1 * | 10/2012 | Cornog | G06T 7/97 |
| | | | | 348/46 |
| 2012/0321172 | A1 * | 12/2012 | Jachalsky | G06T 7/593 |
| | | | | 382/154 |

(Continued)

OTHER PUBLICATIONS

Fan X., et al., "Occlusion-Aware Self-Supervised Stereo Matching with Confidence Guided Raw Disparity Fusion", 2022 19th Conference on Robots and Vision (CRV), IEEE, May 31, 2022, pp. 132-139, XP034178882, DOI: 10.1109/CRV55824.2022.00025, abstract sections I-IV figures 1, 3.

(Continued)

*Primary Examiner* — Jiangeng Sun
(74) *Attorney, Agent, or Firm* — Polsinelli LLP

(57) ABSTRACT

Systems and techniques are provided for generating disparity information from two or more images. For example, a process can include obtaining first disparity information corresponding to a pair of images, the pair of images including a first image of a scene and a second image of the scene. The process can include obtaining confidence information associated with the first disparity information. The process can include processing, using a machine learning network, the first disparity information and the confidence information to generate second disparity information corresponding to the pair of images. The process can include combining, based on the confidence information, the first disparity information with the second disparity information to generate a refined disparity map corresponding to the pair of images.

30 Claims, 9 Drawing Sheets

(56) References Cited

U.S. PATENT DOCUMENTS

| | | | | |
|---|---|---|---|---|
| 2013/0027513 A1* | 1/2013 | Corral-Soto | ......... | H04N 13/128 |
| | | | | 348/E13.064 |
| 2014/0063188 A1* | 3/2014 | Smirnov | ................ | G06T 7/593 |
| | | | | 348/43 |
| 2019/0295282 A1* | 9/2019 | Smolyanskiy | ........ | G01S 13/867 |
| 2021/0150227 A1* | 5/2021 | Hu | ......................... | G06V 20/64 |

OTHER PUBLICATIONS

International Search Report and Written Opinion—PCT/US2024/021777—ISA/EPO—Jul. 15, 2024.

Ye X., et al., "Improved Real-Time Three-Dimensional Stereo Matching With Local Consistency", Image and Vision Computing, Elsevier, Guildford, GB, vol. 124, Jun. 16, 2022, 9 Pages, XP087125336, Doi: 10.1016/J.IMAVIS.2022.104509, abstract sections 3.1-3.3 figures 2, 3.

* cited by examiner

DISPARITY-BASED DEPTH REFINEMENT USING CONFIDENCE INFORMATION AND STEREOSCOPIC DEPTH INFORMATION

FIELD

The present disclosure generally relates to depth estimation from one or more images. For example, aspects of the present disclosure relate to systems and techniques for performing disparity-based depth estimation using confidence-based fusion.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for depth estimation using confidence-based fusion. For example, the systems and techniques can perform disparity estimation refinement based on using confidence information to fuse depth-from-stereo (DFS) disparity information with predicted disparity refinement information generated by a machine learning network. In some aspects, the confidence information can be a confidence map associated with the DFS disparity information. The DFS disparity information can be a disparity map corresponding to a disparity-based depth estimation associated with a pair of stereoscopic images. The predicted disparity refinement information can be a predicted refined disparity map generated using a deep learning (DL) machine learning network, such as a deep neural network.

According to various aspects, a method for generating disparity information from two or more images is provided, the method comprising: obtaining first disparity information corresponding to a pair of images, the pair of images including a first image of a scene and a second image of the scene; obtaining confidence information associated with the first disparity information; processing, using a machine learning network, the first disparity information and the confidence information to generate second disparity information corresponding to the pair of images; and combining, based on the confidence information, the first disparity information with the second disparity information to generate a refined disparity map corresponding to the pair of images.

In various aspects, an apparatus for generating disparity information from two or more images is provided that includes a memory (e.g., configured to store data, such as audio data, etc.) and one or more processors (e.g., implemented in circuitry) coupled to the memory. The one or more processors are configured to and can: obtain first disparity information corresponding to a pair of images, the pair of images including a first image of a scene and a second image of the scene; obtain confidence information associated with the first disparity information; process, using a machine learning network, the first disparity information and the confidence information to generate second disparity information corresponding to the pair of images; and combine, based on the confidence information, the first disparity information with the second disparity information to generate a refined disparity map corresponding to the pair of images In various aspects, a non-transitory computer-readable medium is provided that has stored thereon instructions that, when executed by one or more processors, cause the one or more processors to: obtain first disparity information corresponding to a pair of images, the pair of images including a first image of a scene and a second image of the scene; obtain confidence information associated with the first disparity information; process, using a machine learning network, the first disparity information and the confidence information to generate second disparity information corresponding to the pair of images; and combine, based on the confidence information, the first disparity information with the second disparity information to generate a refined disparity map corresponding to the pair of images.

In various aspects, an apparatus is provided. The apparatus includes: means for obtaining first disparity information corresponding to a pair of images, the pair of images including a first image of a scene and a second image of the scene; means for obtaining confidence information associated with the first disparity information; means for processing, using a machine learning network, the first disparity information and the confidence information to generate second disparity information corresponding to the pair of images; and means for combining, based on the confidence information, the first disparity information with the second disparity information to generate a refined disparity map corresponding to the pair of images.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

The same reference numbers in different drawings may identify the same or similar elements.

DETAILED DESCRIPTION

Figure 1:
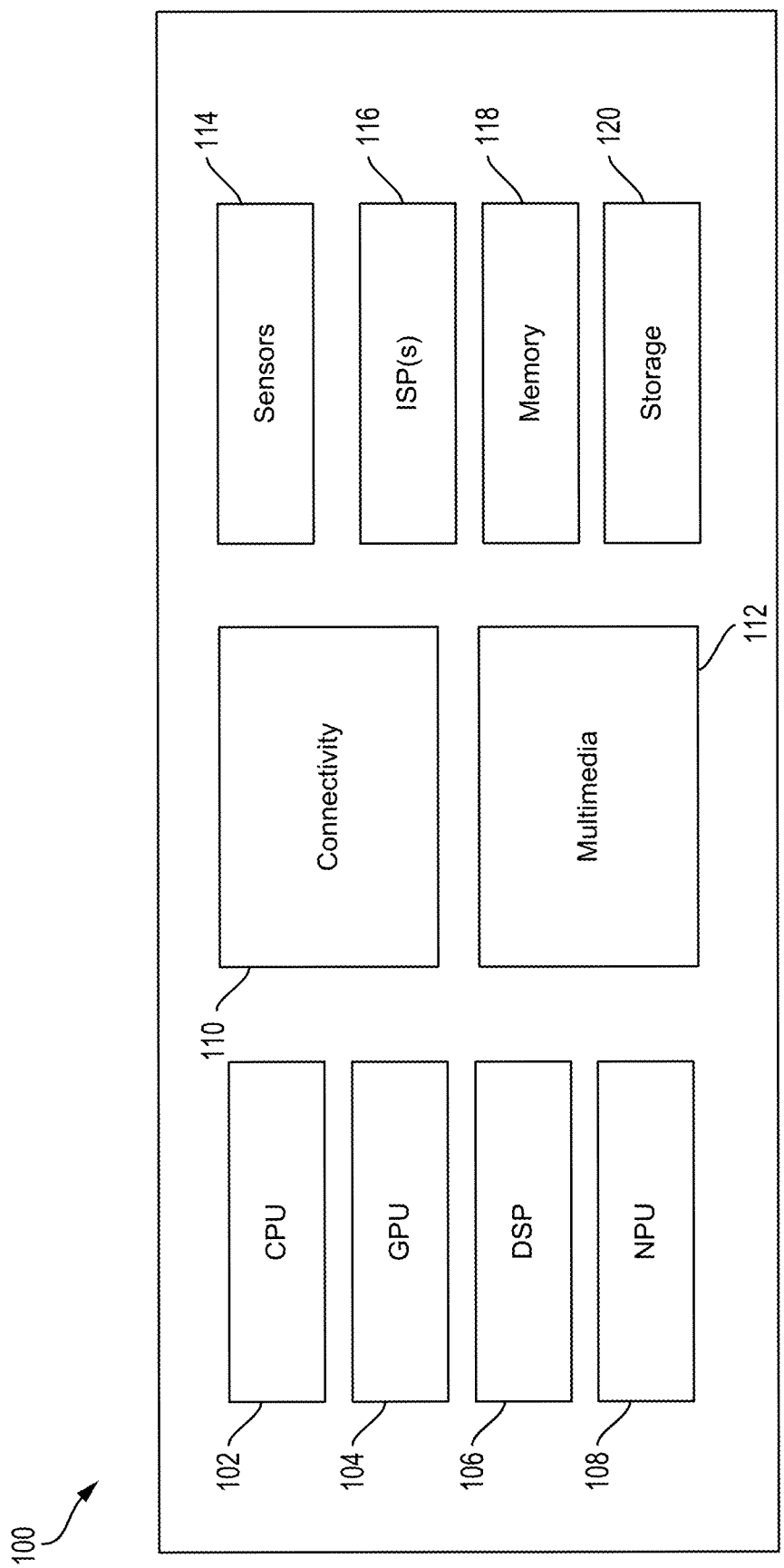
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted above, machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can perform depth estimation based on a single image (e.g., based on receiving a single image as input). Depth estimation based on a single input image can be referred to as monocular depth estimation. Depth estimation based on a pair of stereoscopic images (e.g., corresponding to two slightly different views of the same scene) can be referred to as stereo depth estimation and/or depth-from-stereo (DFS).

Depth estimation can be used for many applications (e.g., XR applications, vehicle applications, etc.). In some cases, depth estimation can be used to perform occlusion rendering, for example based on using depth and/or object segmentation information to render virtual objects in a 3D environment. In some cases, depth estimation can be used to perform 3D reconstruction, for example based on using depth information and one or more poses to create a mesh of a scene. In some cases, depth estimation can be used to perform collision avoidance, for example based on using depth information to estimate distance(s) to one or more objects.

Depth estimation can be used to generate three-dimensional content (e.g., such as XR content) with greater accuracy. For instance, depth estimation can be used to generate XR content that combines a baseline image or video with one or more augmented overlays of rendered 3D objects. The baseline image data (e.g., an image or a frame of video) that is augmented or overlaid by an XR system may be a two-dimensional (2D) representation of a 3D scene. A naïve approach to generating XR content may be to overlay a rendered object onto the baseline image data, without compensating for 3D depth information that may be represented in the 2D baseline image data.

Depth information can be obtained from one or more depth sensors which can include, but are not limited to, Time of Flight (ToF) sensors and Light Detection and Ranging (LIDAR) sensors. Depth information can additionally, or alternatively, be obtained as a prediction or estimation that is generated based on one or more image inputs, depth inputs, etc. Accurate depth information can be used for autonomous and/or self-driving vehicles to perceive a driving scene and surrounding environment, and to estimate the distances between the autonomous vehicle and surrounding environmental objects (e.g., other vehicles, pedestrians, roadway elements, etc.). Accurate depth information is needed for the autonomous vehicle to determine and perform appropriate control actions, such as velocity control, steering control, braking control, etc.

Depth information can be used for extended reality (XR) applications for functions such as indoor scene reconstruction and obstacle detection for users, among various others. Accurate depth information can be needed for improved integration of real scenes with virtual scenes and/or to allow users to smoothly and safely interact with both their real-world surroundings and the XR or VR environment. Depth information can be used in robotics to perform functions such as navigation, localization, and interaction with physical objects in the robot's surrounding environment, among various other functions. Accurate depth information can be needed to provide improved navigation, localization, and interaction between robots and their surrounding environment (e.g., to avoid colliding with obstacles, nearby humans, etc.).

Depth information can be used for image enhancement and/or other image manipulation applications or functions. For example, depth information can be used to differentiate foreground and background portions of an image, which can subsequently be processed, manipulated, enhanced, etc., separately. For instance, depth information can be used to generate a bokeh effect that simulates an image taken with a low aperture value (e.g., a large physical aperture size), where the foreground of the image is sharply in focus while the background of the image is blurred (e.g., out of focus).

Disparity estimation is a type of depth estimation that can be performed based on two (or more) images that depict the same scene from slightly different viewpoints. For instance, disparity estimation can be performed for pairs of stereo images (e.g., a left-right stereo image pair, an upper-lower stereo image pair, etc.). Stereo image pairs can be obtained using a stereo camera (e.g., a single camera device that includes two imaging sensors or sub-systems located in different positions). Stereo image pairs can additionally, or alternatively, be obtained using multiple different camera devices (e.g., a first camera device is used to capture a first image of the stereo pair, and a separate, second camera device is used to capture the second image of the stereo pair). In some examples, stereo image pairs can be obtained using a single camera device, where the first and second images of the stereo pair are captured at different moments in time and using different viewpoints of the scene.

As used herein, a stereo image pair can include a first image (e.g., corresponding to a first view of a scene) and a second image (e.g., corresponding to a second view of the scene, the second view different from the first view). The first and second images of a stereo image pair are also referred to herein as the "left" image and the "right" image, respectively. The left image of a stereo image pair can be associated with a "left camera," which may refer to an image sensor or other imaging system used to obtain the left image. The right image of a stereo image pair can be associated with a "right camera," which may refer to an image sensor or other imaging system used to obtain the left image. As used herein, the terms "left camera" and "right camera" may refer to separate camera devices and/or may refer to a stereo camera device (or other single camera device that includes two image sensors or imaging sub-systems).

Disparity estimation can be performed to determine or otherwise estimate disparity information corresponding to a stereo image pair. Given a point or location of a scene that is depicted in both images of a stereo image pair, the disparity can be determined as the difference between the corresponding pixel location in the left and right images of the stereo pair. In various aspects, disparity can be the difference in image location (e.g., pixel location) of the same 3D point when projected under perspective to the left and right cameras associated with capturing a stereo image pair. For instance, any point in the scene that is visible in both cameras will be projected to a pair of image points in the two images (e.g., referred to as a conjugate pair). The displacement between the pixel positions of the two points is the disparity.

Disparity estimation can be used to generate a disparity map corresponding to a stereo image pair. The disparity map can have the same pixel resolution as the stereo image pair, and can include a calculated disparity value for each pixel location of the plurality of pixels included in the resolution. The disparity map can be indicative of the disparity between an anchor image (e.g., either the left or right image of the stereo pair, selected and used as a baseline for generating the disparity map) and a non-anchor image (e.g., the remaining one of either the left or right image of the stereo pair). The magnitude or absolute value of the disparity may be the same in the disparity map generated using the left image of a stereo pair as the anchor (e.g., a left-to-right disparity map) as it is in the disparity map generated using the right image of the stereo pair as the anchor (e.g., a right-to-left disparity map). The directionality or sign of the disparities in the left-to-right disparity map may be the opposite of those in the right-to-left disparity map.

A disparity map generated for a stereo image pair can be used to generate depth information of the scene depicted in the stereo image pair. For example, depth information (e.g., a depth estimate) can be determined using the disparity map and camera intrinsics information corresponding to the left and right cameras used to capture the left and right images (respectively), of the stereo image pair. Camera intrinsics information can include the distance between the image sensor or imaging plane of the left camera and the image sensor or imaging plane of the right camera (e.g., the baseline distance between the left and right cameras). The camera intrinsics information can additionally include a focal length associated with the left camera/left image and a focal length associated with the right camera/right image. Given the baseline distance and respective focal lengths of the left and right cameras, a one-to-one mapping between disparity information and depth information can be calculated. For instance, a depth map can be generated based on calculating, for each pixel location of the disparity map, a corresponding depth value given by: depth=(baseline*focal length)/disparity.

In some examples, various feature matching algorithms can be used to estimate the disparity between a pair of stereo images (e.g., feature matching algorithms can be used to generate or estimate a disparity map corresponding to a stereo image pair). Feature matching algorithms may implement local or global feature matching. For example, local feature matching can be implemented to naively look for matches across local patches based on a robust function. Global feature matching can be implemented using relatively more complex optimization techniques, and may also be referred to as optimization-based feature matching algorithms.

Disparity maps generated using feature matching algorithms are often imperfect estimates and include errors and/or other inaccuracies. For example, disparity maps generated using feature matching can be affected by artifacts that correspond to feature matching errors near occlusions, thin structures, reflective surfaces, etc., that are depicted in the stereo image pair. Estimated disparity maps generated using feature matching can additionally, or alternatively, have missing regions (e.g., corresponding to a lack of salient visual features, failed feature matching, etc.). There is a need for improved disparity estimation that can be used to generate more accurate disparity map estimations and/or disparity map estimations with fewer artifacts and feature matching errors.

In some examples, a disparity estimation pipeline can additionally include a refinement module that is used to refine the initial estimated disparity map generated using a feature matching algorithm. Existing techniques for disparity map refinement may be based on non-local-means filtering, dictionary-based techniques, filter forests, etc. In some cases, machine learning networks (e.g., deep learning networks) can be used to generate a refined disparity map for an input comprising an estimated disparity map (e.g., an initial estimated disparity map generated based on feature matching). Deep learning-based disparity refinement can be used to sequentially detect, replace, and refine noisy pixels in an input or initial disparity map estimate. However, deep-learning based disparity refinement does not always provide accurate refined results, and can generate refined disparity maps with an accuracy that is approximately the same as (or even less than) the accuracy of the initial disparity map estimation provided as input. There is a need for systems and techniques that can be used to generate more accurate disparity maps and/or disparity estimations for stereo image pairs. There is a further need for systems and techniques that can be used to perform more accurate disparity refinement.

Systems, apparatuses, processes (also referred to as methods), and computer-readable media (collectively referred to as "systems and techniques") are described herein for using confidence-based fusion to generate refined disparity information corresponding to a pair of images (e.g., a stereo image pair). For example, the refined disparity information can be a refined disparity map corresponding to the pair of images. In some examples, the systems and techniques can generate the refined disparity map by fusing a first disparity information with a second disparity information, based on confidence information associated with the first disparity information. The first and second disparity information can correspond to the same pair of images (e.g., are indicative of disparity information of the same stereo image pair). The first disparity information can be a first disparity map corresponding to a stereo image pair and the second disparity information can be a second disparity map corresponding to the stereo image pair. In some examples, the second disparity information can be a refinement of the first disparity information. For instance, the second disparity information can be an initial refined disparity map generated based on the first disparity map.

In some aspects, the first disparity map can be a depth-from-stereo (DFS) disparity map. A DFS disparity map can be generated based on performing feature matching for the stereo image pair. The second disparity map can be generated based on the DFS disparity map. For example, the second disparity map can be generated based on using a machine learning network to refine the DFS disparity map. In some aspects, the second disparity map can be generated using a deep learning (DL)-based refinement network. An output of the DL-based refinement network (e.g., the second disparity map) may also be referred to as an initial refined disparity map.

The systems and techniques can fuse the DFS disparity map with the initial refined disparity map, based on confidence information (e.g., a confidence map) associated with the DFS disparity map. For example, the confidence-based fusion can be used to generate a final refined disparity map that includes a combination of disparity information of the DFS disparity map and disparity information of the DL-based refined disparity map. The combination (e.g., fusion) of the DFS and DL-based refined disparity maps can be performed based on each respective pixel location included in the disparity maps. For instance, the fused disparity output corresponding to each pixel location can be weighted using the corresponding confidence value (e.g., from the confidence map) for each pixel location.

In some aspects, the final fused output (e.g., the final refined disparity map generated as output by the systems and techniques described herein) can include a refined disparity value for each pixel location i determined as $(confidence_i * DFS_i) + (1 - confidence_i) * predicted_i$. Here, $confidence_i$ represents the confidence information (e.g., confidence value from the confidence map) corresponding to pixel location i; $DFS_i$ represents the estimated disparity information (e.g., disparity value from the DFS disparity map) corresponding to pixel location i; and $predicted_i$ represents the predicted disparity information (e.g., disparity value from the DL-based refined disparity map) corresponding to pixel location i.

In some cases, the systems and techniques can determine the confidence information using a confidence estimation engine. The confidence estimation engine can generate a confidence map indicative of confidence information (e.g., a confidence value) for each pixel location of a plurality of pixel locations associated with the stereo image pair. In some cases, relatively low confidence values can correspond to estimates of relatively high error in the DFS disparity map. In some examples, the confidence estimation engine can extract a plurality of respective features from the first and second images of the stereo image pair. The confidence estimation engine can process the extracted features and the DFS disparity map estimation to determine potential issues, occluded regions, and/or various other pixel locations corresponding to relatively high error and low confidence. In some aspects, the confidence estimation engine can generate the confidence map based on left-right consistency information determined for the stereo image pair. The left-right consistency information can be determined based on analyzing the DFS disparity map generated using the left image as the reference frame (e.g., anchor) and the DFS disparity map generated using the right image as the reference frame (e.g., anchor).

In some examples, the systems and techniques can implement early termination to skip processing the DFS disparity map with the DL-based refinement network and performing confidence-based fusion to generate the refined disparity map output. For example, an early termination engine can analyze information associated with an input stereo image pair, the DFS disparity map associated with the stereo image pair, and the corresponding confidence map for the DFS disparity map. The early termination engine can determine a need or potential gain associated with processing the DFS disparity map with the DL-based refinement network, and may skip the DL-based refinement and confidence-based fusion based on a comparison between one or more statistics associated with the DFS disparity map and a corresponding plurality of statistics. In some examples, the systems and techniques can use the DFS disparity map as the final refined disparity map output when early termination is performed.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
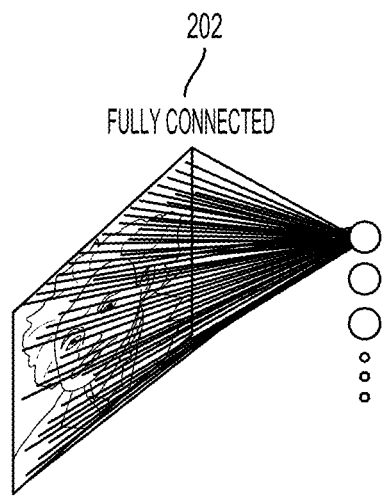
FIG. 2A illustrates an example of a fully connected neural network, in accordance with some examples.
Figure 2B:
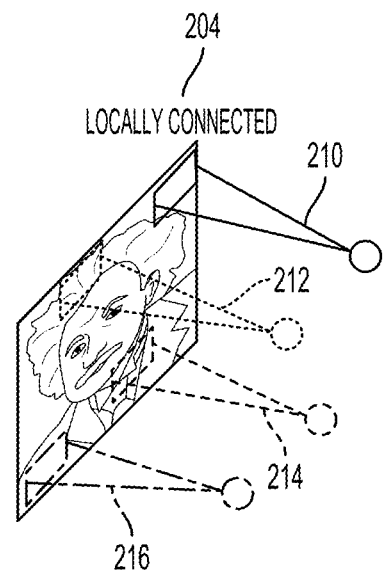
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
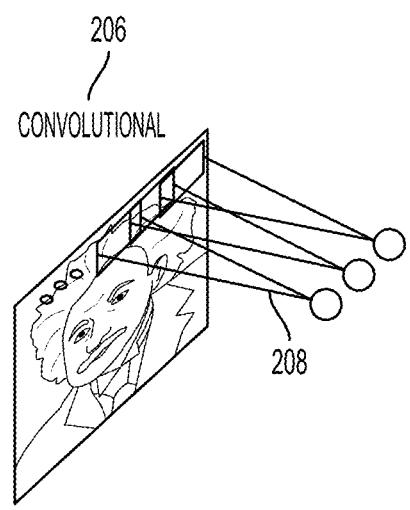
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 7. An illustrative example of a convolutional neural network is described in greater depth with respect to the example block diagram of FIG. 8.

As mentioned previously, the systems and techniques described herein can be used to generate refined disparity information corresponding to a pair of images (e.g., such as a stereo image pair). In some aspects, the systems and techniques can perform confidence-based fusion to generate a refined disparity map from a first disparity map and a second disparity map, as will be described in greater depth below.

Figure 3:
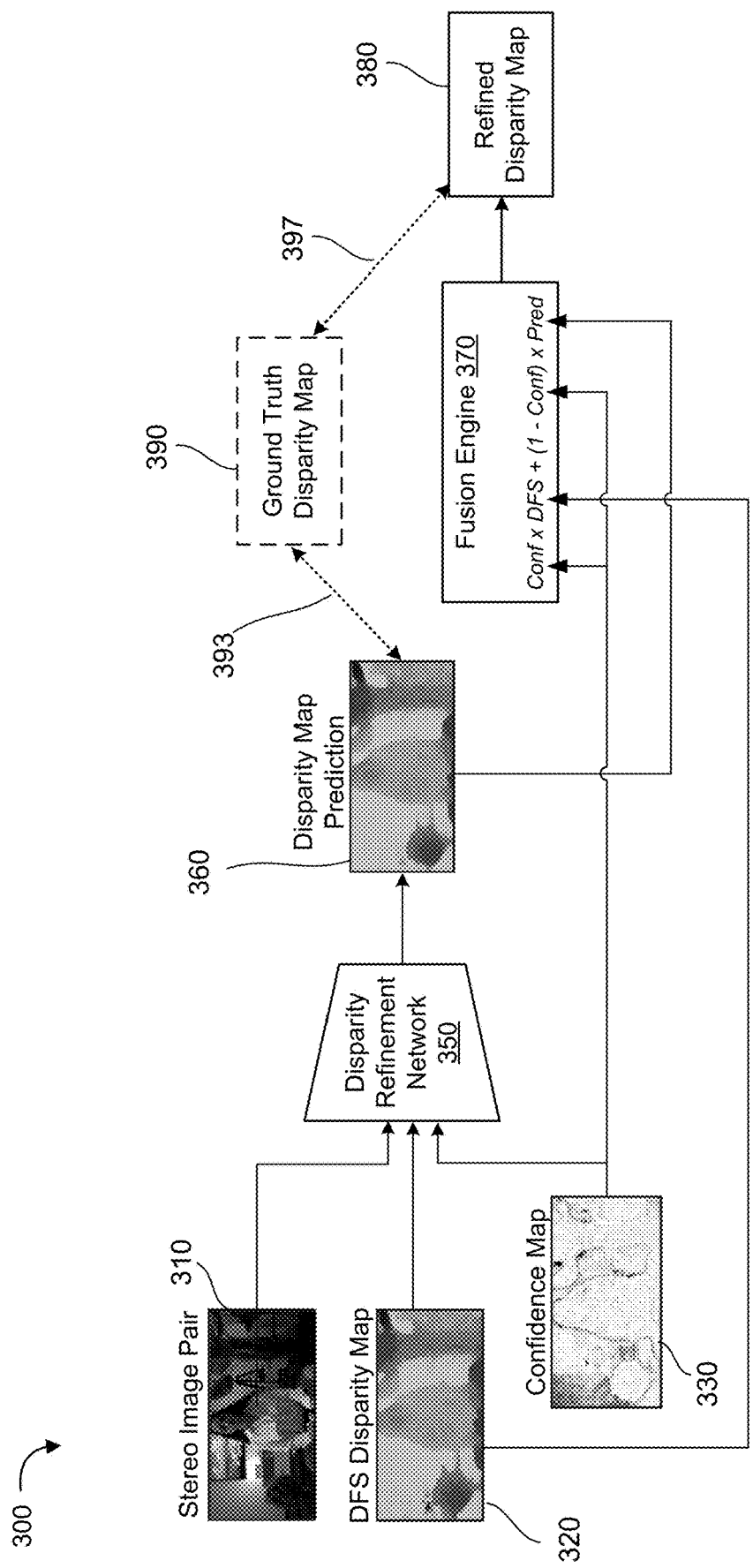
FIG. 3 illustrates an example of a machine learning architecture for confidence-based fusion to generate a refined disparity map or other refined disparity-based depth estimation, in accordance with some examples.

FIG. 3 is a diagram illustrating an example of a machine learning system 300 that can be used to generate a refined disparity map using confidence-based fusion, in accordance with some examples. In various aspects, the machine learning system 300 can include a disparity refinement network 350 and a fusion engine 370. The disparity refinement network 350 can be a machine learning network that is trained to generate a disparity map prediction 360. In some aspects, the disparity refinement network 350 can be a deep learning (DL) network and/or a DL-based network (e.g., a deep neural network, etc.). In some aspects, the disparity refinement network 350 can generate the disparity map prediction 360 based on a first disparity map 320, a confidence map 330, and at least one image of the stereo image pair 310. For instance, the disparity refinement network 350 can generate the disparity map prediction 360 using the first disparity map 320, the confidence map 330, and either the left image or the right image of the stereo image pair 310. In some examples, the disparity refinement network 350 can generate the disparity map prediction 360 using both images of the stereo image pair 310 (e.g., using the first disparity map 320, the confidence map 330, the left image of stereo image pair 310, and the right image of stereo image pair 310).

The stereo image pair 310 includes a first image of a scene and a second image of a scene. The first image may also be referred to as a "left image" and may be associated with a "left camera"; the second image may also be referred to as a "right image" and may be associated with a "right camera" (e.g., as described previously above). The stereo image pair 310 can be associated with a first disparity information 320. For instance, the first disparity information 320 can be indicative of a disparity determined between the left image and the right image of the stereo image pair 310, or vice versa. In other aspects, the "image pair" 310 may include more than two images in which one of the images may serve as the anchor image.

In some aspects, the first disparity information 320 is a first disparity map corresponding to disparity information between the left and right images of the stereo pair 310. In some aspects, the first disparity map 320 can be a depth-from-stereo (DFS) disparity map. A DFS disparity map can be generated based on performing feature matching for the stereo image pair (e.g., using an optimization-based feature matching technique, etc.).

The confidence map 330 can be associated with the DFS disparity map 320, and may be indicative of confidence information (e.g., confidence values) corresponding to each location of a plurality of locations included in the DFS disparity map 320. For instance, the confidence map 330 can be obtained from and/or can be generated using a confidence estimation engine that is the same as or similar to the confidence estimation engine 430 of FIG. 4 (e.g., as will be described below). In some aspects, the confidence information of the confidence map 330 can be determined based on the matching qualities of features determined for one or more of the stereo image pair 310 and the DFS disparity map 320 and/or can be determined based on consistency checks across the left and right images of the stereo image pair 310, as will also be described below with respect to FIG. 4. In some aspects, the confidence map 330 can include a plurality of confidence values each having a numerical value that is indicative of a confidence level (e.g., confidence percentage, etc.) of an estimated disparity value with a corresponding location in the DFS disparity map 320.

For instance, the confidence map 330 and the DFS disparity map 320 can each have the same resolution. Each location in the confidence map 330 can have a corresponding location in the DFS disparity map 320, and vice versa. In some examples, the resolution of the confidence map 330 and the DFS disparity map 320 can additionally be the same as a resolution associated with the stereo image pair 310. For example, the left and right images of the stereo image pair 310 can each include a respective plurality of pixels with a resolution of H×W (e.g., the left image can include a first plurality of pixels with a resolution of H pixels in the height dimension and W pixels in the width dimension; the right image can include a second plurality of pixels with the same resolution of H pixels in the height dimension and W pixels in the width dimension).

As noted previously, a disparity map can be generated to be indicative of disparity information between a left image and a right image, with one of the two images utilized as the anchor image (e.g., baseline or reference) for generating the disparity map. The disparity map can have the same resolution as the anchor image. For instance, the resolution of the DFS disparity map 320 can be the same as the resolution of the left image of the stereo image pair 310 (e.g., which can be the same as the resolution of the right image of the stereo image pair 310).

The DFS disparity map 320 can include an estimated disparity value for each respective pixel of the plurality of pixels included in the anchor image used to generate the DFS disparity map 320. For instance, using the left image of the stereo image pair 310 as the anchor image, the DFS disparity map 320 can include an estimated disparity value for each respective pixel of the left image, where the estimated disparity value is indicative of the disparity (e.g., displacement) of the same point as represented in a pixel included in the right image of the stereo image pair 310.

In some aspects, the DFS disparity map 320 includes a plurality of locations having the same resolution H×W as the stereo image pair 310. For instance, the DFS disparity map 320 can include H estimated disparity values in the height dimension, each estimated disparity value corresponding to a respective one of the H pixels in the height dimension of the anchor image (e.g., left image) of the stereo image pair 310. The DFS disparity map 320 can include W estimated disparity values in the width dimension, each estimated disparity value corresponding to a respective one of the W pixels in the width dimension of the anchor image of the stereo image pair 310.

The confidence map 330 can include a plurality of locations having the same resolution as the H×W DFS disparity map 320 (e.g., and having the same resolution as the H×W plurality of pixels of each image of the stereo image pair 310). The confidence value of a particular location in the confidence map 330 corresponds to a confidence of the estimated DFS value at the same particular location in the DFS disparity map 320.

In some aspects, the disparity refinement network 350 can be a machine learning network used to generate the disparity map prediction 360 (e.g., also referred to as a predicted disparity map). The disparity map prediction 360 can be generated based on at least the DFS disparity map 320. For instance, the disparity map prediction 360 can be a refinement of the DFS disparity map 320. The disparity map prediction 360 and the DFS disparity map 320 can both correspond to the same stereo image pair 310 (e.g., both disparity maps are indicative of disparity values between an anchor image of the stereo image pair 310 and the remaining image of stereo image pair 310). The disparity map prediction 360 can include a plurality of locations each associated with a disparity value. The disparity map prediction 360 can have the same resolution as the DFS disparity map 320 (e.g., which can be the same as the resolution of the stereo image pair 310 and the confidence map 330). The disparity values included in the disparity map prediction 360 may be the same as the corresponding disparity values included in the DFS disparity map 320, may be more accurate than the corresponding disparity values in the DFS disparity map 320, and/or may be less accurate than the corresponding disparity values in the DFS disparity map 320.

The disparity refinement network 350 can generate the disparity map prediction 360 based on one or more of the DFS disparity map 320, the left image of the stereo image pair 310, the right image of the stereo image pair 310, and/or the confidence map 330. In some aspects, the disparity refinement network 350 generates the disparity map prediction 360 using the DFS disparity map 320, the stereo image pair 310, and the confidence map 330 as inputs. In other aspects, the disparity refinement network 350 generates the disparity map prediction 360 using the DFS disparity map 320, the left (or right) image of the stereo image pair 310, and the confidence map 330 as inputs.

As noted previously, the disparity map prediction 360 can be generated based on using a machine learning network (e.g., the disparity refinement network 350) to refine the DFS disparity map 320. In some aspects, the disparity map prediction 360 can be generated using a deep learning (DL)-based refinement network. For example, the disparity refinement network 350 can be implemented using a deep learning machine learning architecture (e.g., a deep neural network, etc.). In some cases, an output of the DL-based disparity refinement network 350 (e.g., the disparity map prediction 360) may also be referred to as an initial refined disparity map.

The machine learning system 300 of FIG. 3 can further include a fusion engine 370. The fusion engine 370 can be used to fuse the DFS disparity map 320 with the initial refined disparity map generated by the disparity refinement network 350 (e.g., the disparity map prediction 360). The fusion engine 370 may generate as output a final refined disparity map 380. In some aspects, the fusion engine 370 can fuse the DFS disparity map 320 and the disparity map prediction 360 based on confidence information associated with the DFS disparity map 320 (e.g., based on the confidence map 330).

For example, the fusion engine 370 can be used to generate the final refined disparity map 380 that includes a combination of disparity information of the DFS disparity map 320 and the disparity information of the DL-based disparity map prediction 360. The final refined disparity map 380 can include a plurality of locations each associated with a fused disparity value. The plurality of locations of the final refined disparity map 380 can have the same resolution as the DFS disparity map 320 and the disparity map prediction 360 (e.g., which can be the same as the resolution of the stereo image pair 310 and the confidence map 330).

The fused disparity value for each particular location in the H×W plurality of locations of the final refined disparity map 380 can be determined using the corresponding confidence value, DFS disparity value, and DL-predicted disparity value at the same particular location in the confidence map 330, the DFS disparity map 320, and the disparity map prediction 360, respectively.

For instance, the fusion engine 370 can receive as input the confidence map 330, the DFS disparity map 320, and the disparity map prediction 360. The fusion engine 370 can generate the fused disparity values corresponding to each location of the plurality of locations of the resolution based on using the respective confidence value for each location to fuse (e.g., weight) the combination of the respective DFS disparity value and DL-predicted disparity value for the same location.

In some aspects, the fused output of the fusion engine 370 (e.g., the final refined disparity map 380) can include a refined disparity value for each location i determined as $(confidence_i * DFS_i) + (1 - confidence_i) * predicted_i$. Here, $confidence_i$ represents confidence information (e.g., a confidence value from the confidence map 330) corresponding to location i; $DFS_i$ represents estimated disparity information (e.g., a disparity value from the DFS disparity map 320) corresponding to location i; and $predicted_i$ represents predicted disparity information (e.g., a disparity value from the DL-based disparity map prediction 360) corresponding to location i.

In some aspects, the refined disparity map 380 generated as output by the fusion engine 370 can more strongly weight disparity information of the DFS disparity map 320 when the corresponding confidence of the disparity information (e.g., as indicated by the corresponding confidence value(s) from the confidence map 330) are relatively high. When the corresponding confidence of the disparity information of the DFS disparity map 320 is relatively low (e.g., as indicated by the corresponding confidence value(s) from the confidence map 330), the fused disparity information of the refined disparity map 380 may more strongly weight the disparity information of the DL-based disparity map prediction 360.

For instance, confidence values may be numerical values indicative of a confidence percentage. In some cases, confidence values can be numerical values between 0 and 1. The disparity values from the DFS disparity map 320 can be weighted by the corresponding confidence value, where a greater confidence value (e.g., closer to a value of 1) corresponds to a greater weighting of the disparity value from the DFS disparity map 320.

The disparity values from the disparity map prediction 360 can be weighted by the complement of the corresponding confidence value (e.g., the complement of a confidence value $confidence_i$ can be determined as $1 - confidence_i$). A greater confidence value (e.g., closer to a value of 1) corresponds to a lesser weighting of the disparity value from the disparity map prediction 360, as a higher confidence value is associated with a lower complement value. A lower confidence value (e.g., closer to a value of 0) corresponds to a greater weighting of the disparity value from the disparity map prediction 360, as a lower confidence value is associated with a higher complement value.

In some aspects, the machine learning system 300 of FIG. 3 can be trained using one or more losses and/or loss functions. For instance, a first loss function can be used to train the disparity refinement network 350 based on a difference (e.g., a loss 393) determined between the disparity map prediction 360 generated for a training data input and a ground truth disparity map 390 corresponding to the training data input. In some aspects, each training data input can include a stereo image pair (e.g., the stereo image pair 310) and a corresponding ground truth disparity map (e.g., the ground truth disparity map 390). In some aspects, the training data input can additionally include a DFS disparity map (e.g., the DFS disparity map 320), a corresponding confidence map (e.g., the corresponding confidence map 330), or both. In some examples, the training data input can include only the stereo image pair 310 and corresponding ground truth disparity map 390, and the DFS disparity map 320 and confidence map 330 can be generated based on the stereo image pair 310.

The disparity refinement network 350 can be trained based on minimizing the loss 393 between the disparity map prediction 360 and ground truth disparity map 390 corresponding to each stereo image pair 310 provided as training data input to disparity refinement network 350. In some aspects, a second loss function can be utilized to train the disparity refinement network 350 based on a difference (e.g., a loss 397) between the ground truth disparity map 390 corresponding to a training data input and the refined disparity map 380 generated by the fusion engine 370 for the same training data input.

As noted previously, in some examples the disparity refinement network 350 may utilize one image of the stereo image pair 310 (e.g., the left image or the right image of stereo image pair 310). For instance, the disparity refinement network 350 can generate the disparity map prediction 360 using the left image of stereo image pair 310 (e.g., without using the right image of stereo image pair 310). In some aspects, the disparity refinement network 350 can be trained based on minimizing the loss 393 between the disparity map prediction 360 and the ground truth disparity map 390 corresponding to each left image (e.g., of a stereo image pair such as stereo image pair 310) provided as training data input to the disparity refinement network 350. As noted above, the second loss function can be utilized to train the disparity refinement network 350 based on a difference (e.g., the loss 397) between the ground truth disparity map 390 corresponding to a training data input and the refined disparity map 380 generated by the fusion engine 370 for the same training data input. For instance, in some aspects, the loss 397 between the refined disparity map 380 and the ground truth disparity map 390 can be implemented as a second stage loss function for training the disparity refinement network 350, where the loss 393 between the disparity map prediction 360 and the ground truth disparity map 390 can be implemented as a first stage loss function for training the disparity refinement network 350.

Figure 4:
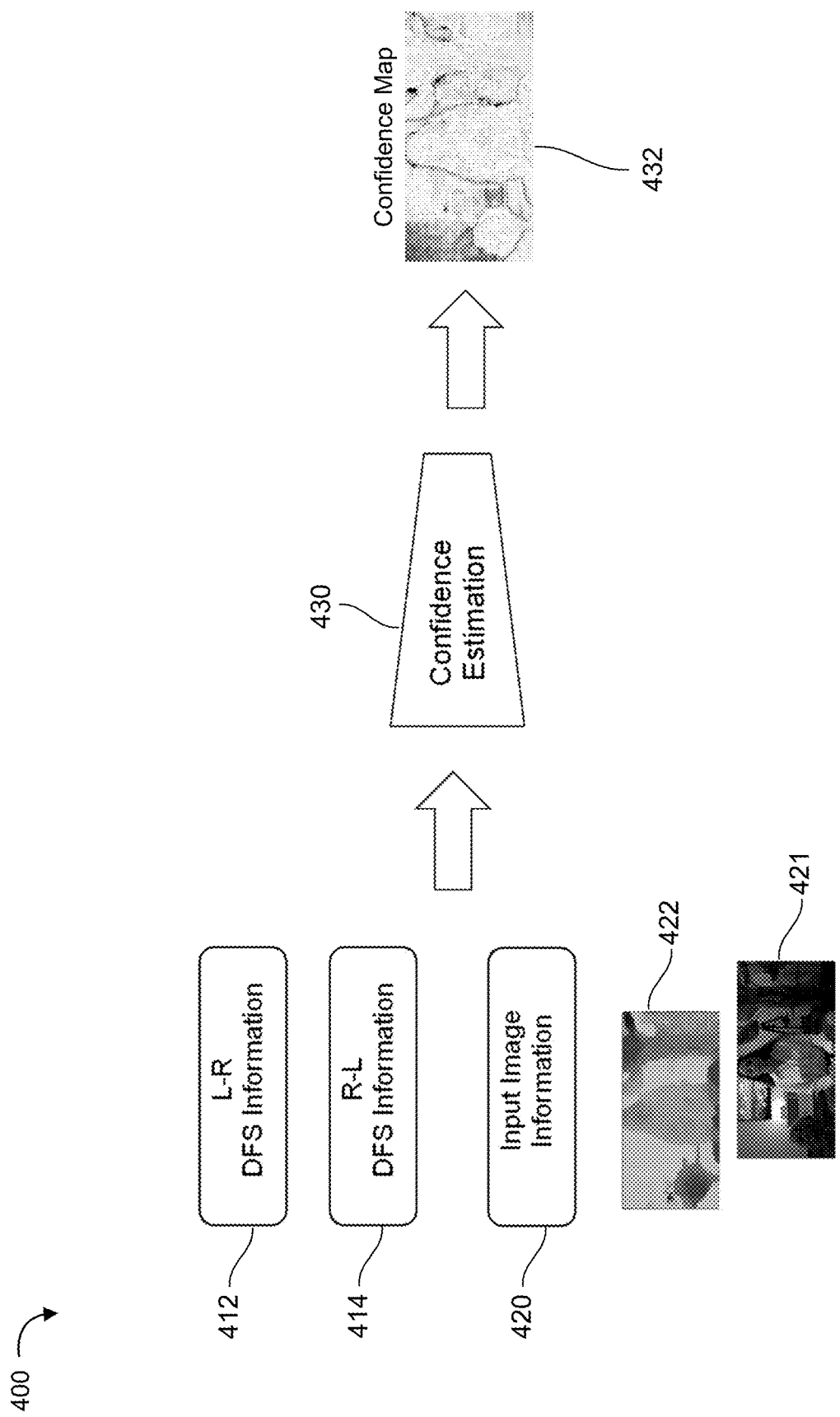
FIG. 4 illustrates an example of a confidence estimation engine, in accordance with some examples.

FIG. 4 is a diagram illustrating an example confidence estimation system 400, in accordance with some examples. The confidence estimation system 400 can include a confidence estimation engine 430. In some aspects, the confidence estimation engine 430 can be used to generate a confidence map 432 corresponding to input image information 420. In some cases, the confidence map 432 can be the same as or similar to the confidence map 330 of FIG. 3. For instance, the input image information 420 can include a stereo image pair 421 (e.g., which may be the same as or similar to the stereo image pair 310 of FIG. 3) and a disparity map 422 (e.g., which may be the same as or similar to the DFS disparity map 320 of FIG. 3).

In some examples, the confidence estimation engine 430 can be included in the machine learning system 300 of FIG. 3. For example, the machine learning system 300 of FIG. 3 can obtain the confidence map 330 as the confidence map 432 generated as output by the confidence estimation engine 430. Similar to that described above with respect to FIG. 3, the confidence map 432 can be generated to include a plurality of confidence values corresponding to each location of a plurality of locations in the disparity map 422 and the stereo image pair 421. Relatively low confidence values can correspond to relatively high estimates of error in the disparity map 422 disparity values.

In some aspects, the confidence estimation engine 430 can extract or otherwise obtain a plurality of respective features from the first and second images (e.g., left and right images) of the stereo image pair 421. The confidence estimation engine 430 can process the extracted features and the DFS disparity map 422 to determine potential issues, occluded regions, and/or various other locations of the DFS disparity map 422 corresponding disparity estimates with relatively high error and low confidence.

In some aspects, the confidence estimation engine 430 can generate the confidence map 432 based on left-right consistency information determined for the stereo image pair 421. In some aspects, the left-right consistency information can be determined based on analyzing the DFS disparity map generated using the left image as the reference frame (e.g., anchor) and the DFS disparity map generated using the right image as the reference frame (e.g., anchor). For example, the confidence estimation engine 430 can receive as input L-R DFS information 412 (e.g., the DFS disparity map with the left image of stereo image pair 421 used as the anchor) and R-L DFS information 414 (e.g., the DFS disparity map with the right image of stereo image pair 421 used as the anchor). In some cases, the left-right consistency check information can be determined by comparing the disparity values of the L-R disparity map 412 with the disparity values of the R-L disparity map 414.

For instance, for each pixel $p_L$ of the left image of stereo pair 421, a corresponding matching point $m_R$ in the right image of stereo pair 421 can be determined using the L-R disparity map 412 (e.g., based on the L-R disparity map 412 including disparity information indicative of the displacement from $p_L$ in the left stereo image to the matching point $m_R$ in the right stereo image).

For the pixel $m_R$ of the right image of stereo pair 421, the corresponding matching point $q_L$ in the left image of stereo pair 421 can be determined using the R-L disparity map 414 (e.g., based on the R-L disparity map 414 including disparity information indicative of the displacement from $m_R$ in the right stereo image to the matching point $q_L$ in the left stereo image).

For each given location of the plurality of locations in the L-R and R-L disparity maps (e.g., each pixel of the plurality of pixels in the L and R stereo images 421), if $p_L=q_L$, the left-right consistency check information can include information indicating that the disparity at the location is assumed to be correct. If $p_L \neq q_L$, the left-right consistency check information can include information indicating that the disparity at the location is incorrect or invalid. In some aspects, the left-right consistency check information can invalidate disparity information for locations that do not pass the left-right consistency check (e.g., locations where $p_L \neq q_L$). For instance, the left-right consistency check may fail for occluded pixels, mismatched pixels, etc.

Figure 5:
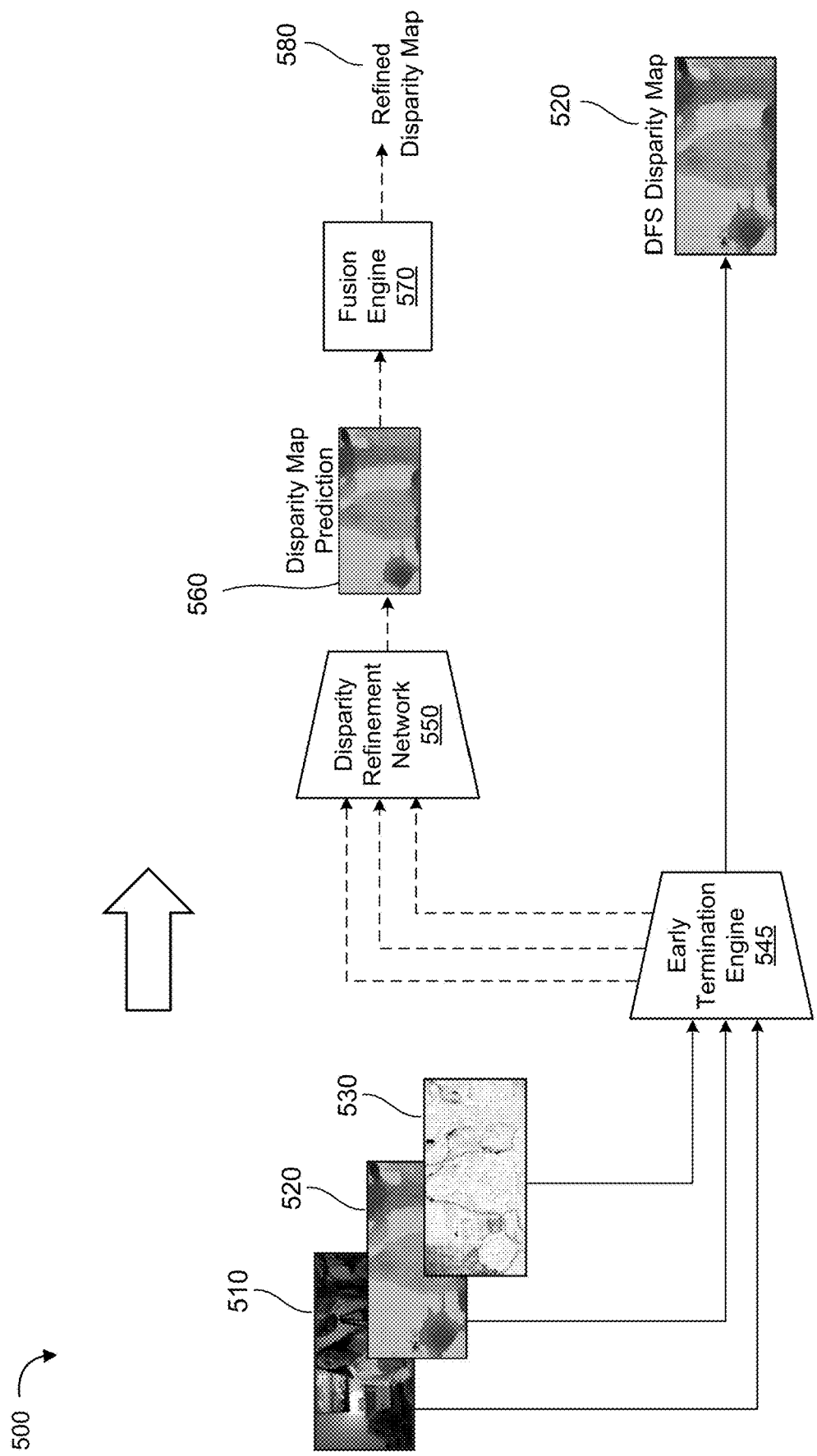
FIG. 5 illustrates an example of a machine learning architecture for confidence-based fusion including an early termination engine, in accordance with some examples.

FIG. 5 is a diagram illustrating an example of a machine learning system 500 that can be used to perform confidence-based fusion with early termination. For instance, an early termination engine 545 can be used to determine whether a set of respective inputs (e.g., a stereo image pair 510, a DFS disparity map 520, and a confidence map 530) are forwarded to a disparity refinement network 550 for generating a disparity map prediction 560 and a subsequently refined disparity map 580, or whether the set of respective inputs skip processing via the disparity refinement network 550 and utilize the original DFS disparity map 520 as a final output disparity map.

In some aspects, the machine learning system 500 can be the same as or similar to the machine learning system 300 of FIG. 3, with the addition of the early termination engine 545. In some examples, the stereo image pair 510 can be the same as or similar to the stereo image pair 310 of FIG. 3. In some cases, the DFS disparity map 520 can be the same as or similar to the DFS disparity map 320 of FIG. 3. In some examples, the confidence map 530 can be the same as or similar to the confidence map 330 of FIG. 3 and/or the confidence map 432 of FIG. 4. In some aspects, the disparity refinement network 550 can be the same as or similar to the disparity refinement network 350 of FIG. 3. For example, the disparity refinement network 550 can generate the disparity map prediction 560 that is the same as or similar to the disparity map prediction 360 described above with respect to FIG. 3 and the disparity refinement network 350. The fusion engine 570 can be the same as or similar to the fusion engine 370 of FIG. 3. For example, the fusion engine 570 can generate a refined disparity map 580 that is the same as or similar to the refined disparity map 380 described above with respect to FIG. and the fusion engine 370.

In some aspects, the systems and techniques described herein can implement early termination to skip processing of the input or initial DFS disparity map 520 with the DL-based refinement network 550 and to skip performing confidence-based fusion (e.g., skip using fusion engine 570) to generate the refined disparity map output 580. For example, the early termination engine 545 can analyze information associated with the input stereo image pair 510, the DFS disparity map 520 associated with the stereo image pair 510, and the corresponding confidence map 530 for the DFS disparity map 520. The early termination engine 545 can determine a need or potential gain associated with processing the DFS disparity map 520 with the DL-based refinement network 550, and may skip using the processing path that includes the DL-based refinement network 550 and the fusion engine 570.

For instance, in some cases the early termination engine 545 can trigger early termination and utilize the original input DFS disparity map 520 as the output of the machine learning system 500 (e.g., rather than using the processing pipeline with the DL-based refinement network 550 and the fusion engine 570 to generate the refined disparity map 580 as the output of machine learning system 500). In some aspects, the early termination engine 545 can trigger or otherwise perform early termination based on processing statistics extracted from the input stereo image pair 510, the DFS disparity map 520, and the confidence map 530. For instance, the statistics may include, but are not limited to, one or more of histograms, percentiles, averages, and medians.

Figure 6:
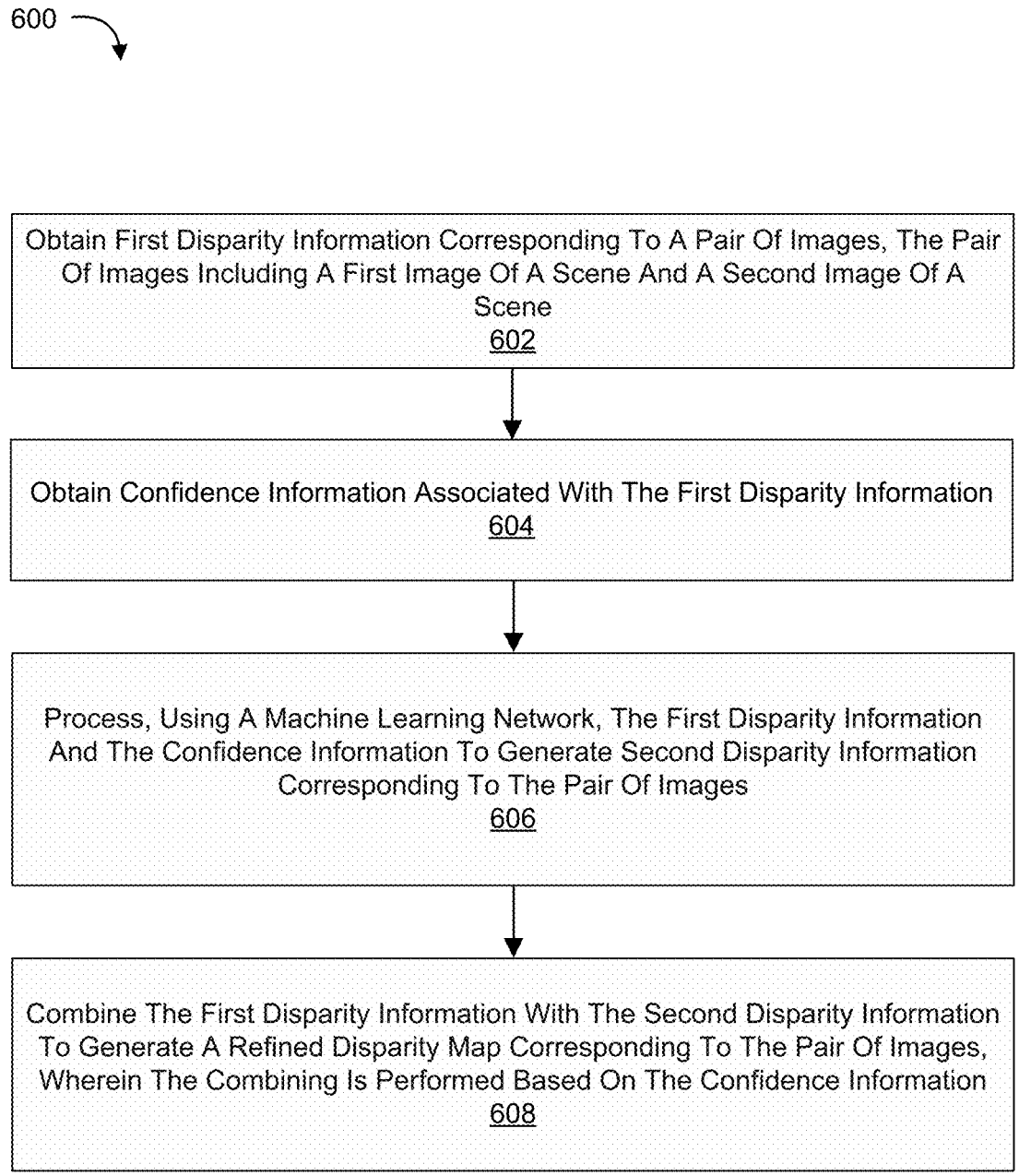
FIG. 6 is a flow diagram illustrating an example process for generating refined disparity map information, in accordance with aspects of the present disclosure.

FIG. 6 is a flowchart illustrating an example process 600 for generating refined disparity-based depth estimations using one or more of the techniques described herein. The process 600 can be performed by a computing device (or apparatus), or a component of a computing device (e.g., a chipset, a processor such as a neural processing unit (NPU), a digital signal processor (DSP), etc.), utilizing or implementing a machine learning model (e.g., the machine learning system 300 of FIG. 3, the machine learning system 500 of FIG. 5, etc.).

At block 602, the process 600 includes obtaining first disparity information corresponding to a pair of images, the pair of images including a first image of a scene and a second image of the scene. For example, the pair of images can be a stereoscopic image pair including a left view of the scene and a right view of the scene. In some examples, the pair of images can be a stereoscopic image pair (e.g., a stereo image pair) that is the same as or similar to one or more of the stereo image pair 310 of FIG. 3, the stereo image pair 421 of FIG. 4, and/or the stereo image pair 510 of FIG. 5.

In some cases, the first disparity information is an estimated disparity map including a plurality of estimated disparity values. For instance, the first disparity map can be the same as or similar to one or more of the disparity map 320 of FIG. 3, the disparity map 422 of FIG. 4, and/or the disparity map 520 of FIG. 5. The first disparity information can include the plurality of estimated disparity values, where each respective estimated disparity value of the plurality of estimated disparity values is associated with a particular location of a plurality of locations in the estimated disparity map. For instance, the plurality of locations can be pixel locations, pixel coordinates, etc. In some examples, the plurality of locations in the estimated disparity map is the same as the plurality of locations in the predicted disparity map. The predicted disparity map can be the same as or similar to one or more of the disparity map prediction 360 of FIG. 3 and/or the disparity map prediction 560 of FIG. 5. In some cases, the first disparity information comprises a depth-from-stereo (DFS) disparity map generated based on feature matching between the first image and the second image (e.g., the same as or similar to the DFS disparity map 320 of FIG. 3, etc.).

At block 604, the process 600 includes obtaining confidence information associated with the first disparity information. For instance, the confidence information can be the same as or similar to one or more of the confidence map 330 of FIG. 3, the confidence map 432 of FIG. 4, and/or the confidence map 530 of FIG. 5.

In some cases, obtaining the confidence information can comprise obtaining a plurality of features corresponding to the pair of images and processing the plurality of features and the first disparity information to determine one or more locations included in the first disparity information corresponding to a respective one or more occluded regions of the pair of images. A respective confidence value can be generated for each location of a plurality of locations included in the confidence information, wherein the respective confidence value is based on whether each location corresponds to the one or more occluded regions.

In some examples, the confidence information can be generated using the confidence estimation engine 430 of FIG. 4. For instance, a left-to-right disparity map can be determined between the first and second images of the pair of images, using the first image as an anchor image for the first disparity map. The left-to-right disparity map can be the same as or similar to the L-R DFS information 412 of FIG. 4. A right-to-left disparity map can be determined between the first and second images of the pair of images, using the second image as an anchor image for the second disparity map. The right-to-left disparity map can be the same as or similar to the R-L DFS information 414 of FIG. 4. The left-to-right disparity map and the right-to-left disparity map can be processed (e.g., using the confidence estimation engine 430 of FIG. 4) to generate left-right consistency information indicative of one or more valid locations included in the first disparity information and one or more invalid locations included in the first disparity information. The respective confidence values included in the confidence information (e.g., confidence map) can be generated and/or determined based on whether each location corresponds to a valid or invalid location included in the first disparity information.

At block 606, the process 600 includes processing, using a machine learning network, the first disparity information and the confidence information to generate second disparity information corresponding to the pair of images. For example, the machine learning network can be a neural network trained to generate a refined disparity map corresponding to an input disparity map. In some cases, the machine learning network can be the same as or similar to the disparity refinement network 350 of FIG. 3 and/or the disparity refinement network 550 of FIG. 5.

The second disparity information can be a predicted disparity map including a plurality of predicted disparity values, each respective predicted disparity value of the plurality of predicted disparity values associated with a particular location of a plurality of locations in the predicted disparity map. For instance, the predicted disparity map can be the same as or similar to one or more of the disparity map prediction 360 of FIG. 3 and/or the disparity map prediction 560 of FIG. 5. In some examples, the respective predicted disparity value associated with the particular location in the predicted disparity map corresponds to the respective estimated disparity value associated with the particular location in the estimated disparity map.

In some cases, the respective predicted disparity value associated with the particular location within the second disparity information (e.g., predicted disparity map) can be generated based on using the machine learning network (e.g., disparity refinement network) to refine the respective estimated disparity value associated with the particular location in the first disparity information (e.g., estimated disparity map). In some examples, the second disparity information comprises a predicted disparity map generated based on the DFS disparity map, the confidence information, and at least one of the first image or the second image. For instance, the second disparity information (e.g., the disparity map prediction 360 of FIG. 3 and/or the disparity map prediction 560 of FIG. 5) can be generated based on the DFS disparity map, the confidence information, and the left image of the stereo image pair 310, 510 (respectively).

In some cases, each of the first image and the second image includes a plurality of pixels having a resolution (e.g., a pixel resolution with a width resolution given in quantity of pixels and a height resolution given in quantity of pixels). The first disparity information can include an estimated disparity map for the pair of images, the estimated disparity map comprising a plurality of locations having the resolution. The confidence information can include a confidence map corresponding to the estimated disparity map, the confidence map comprising a plurality of locations having the resolution. The second disparity information can include a predicted disparity map for the pair of images, the predicted disparity map comprising a plurality of locations having the resolution.

At block 608, the process 600 includes combining, based on the confidence information, the first disparity information with the second disparity information to generate a refined disparity map corresponding to the pair of images. For instance, the refined disparity map can be the same as or similar to the refined disparity map 380 of FIG. 3 and/or the refined disparity map 580 of FIG. 5. In some examples, the refined disparity map can be generated using a fusion engine that is the same as or similar to the fusion engine 370 of FIG. 3 and/or the fusion engine 570 of FIG. 5.

For example, the fusion engine can be used to fuse the first disparity information with the confidence information to generate a first fused disparity map (e.g., confidence$_i$*DFS$_i$, such as described above with respect to FIG. 3), and to fuse the second disparity information with a complement of the confidence information to generate a second fused disparity map (e.g., (1−confidence$_i$)*predicted$_i$, such as described above with respect to FIG. 3). The fusion engine can combine the first fused disparity map and the second fused disparity map to generate the refined disparity map (e.g., the refined disparity map 380 of FIG. 3 and/or the refined disparity map 580 of FIG. 5).

In some cases, the confidence information includes a confidence map comprising a plurality of locations having a resolution, each location of the plurality of locations including a confidence value representing a respective confidence value of a disparity prediction having a corresponding location in the first disparity information. In some examples, the complement of the confidence information comprises a plurality of locations having the resolution, each location of the plurality of locations including a value determined as one minus the respective confidence value having a corresponding location in the confidence map.

In some examples, each location of a plurality of locations in the refined disparity map includes a fused disparity value representing a weighted combination of a respective estimated disparity value having a corresponding location in the estimated disparity map and a respective predicted disparity value having a corresponding location in the predicted disparity map. In some cases, the weighted combination is based on a respective confidence value having a corresponding location in the confidence map. In some examples, the weighted combination can be determined based on weighting the respective estimated disparity value by the respective confidence value and weighting the respective predicted disparity value by one minus the respective confidence value As noted above, the processes described herein (e.g., process 600 and/or any other process described herein) may be performed by a computing device or apparatus utilizing or implementing a machine learning model (e.g., the machine learning system 300 of FIG. 3, the machine learning system 500 of FIG. 5, etc.). In one example, the process 600 can be performed by the electronic device 100 of FIG. 1. In another example, the process 600 can be performed by the computing system having the computing device architecture of the computing system 900 shown in FIG. 9. For instance, a computing device with the computing device architecture of the computing system 900 shown in FIG. 9 can implement the operations of FIG. 6 and/or the components and/or operations described herein with respect to any of FIGS. 3 through 6.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component (s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
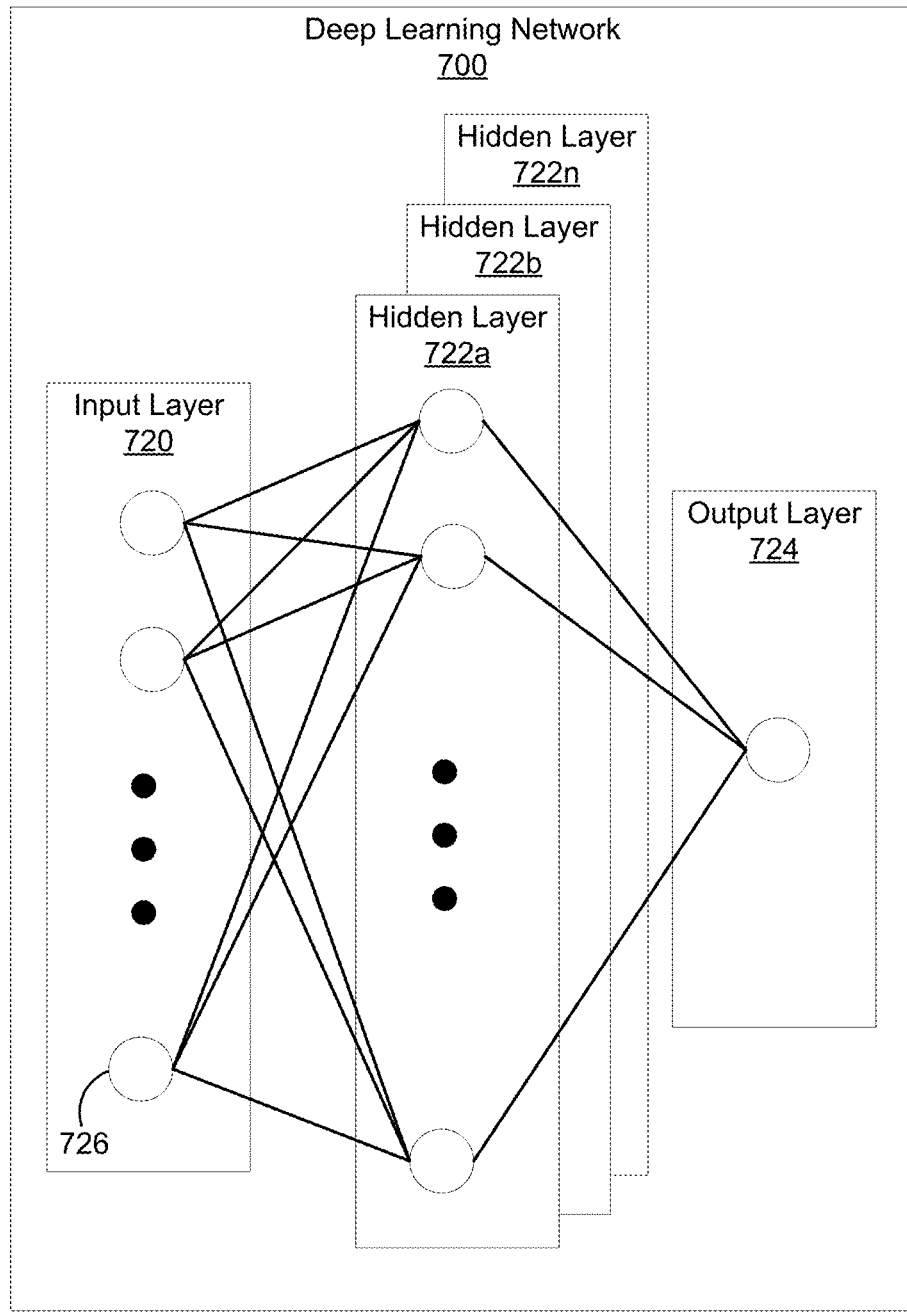
FIG. 7 is a block diagram illustrating an example of a deep learning network, in accordance with some examples.

FIG. 7 is an illustrative example of a deep learning neural network 700 that can be used by the machine learning architecture 300 of FIG. 3 and/or the machine learning architecture 500 of FIG. 5. An input layer 720 includes input data. In various aspects, the input layer 720 can include data representing the pixels of an input video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n. In some aspects, the output layer 724 can provide a classification for an object in an input video frame. The classification can include a class identifying the type of object (e.g., a person, a dog, a cat, or other object).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the hidden layers 722a, 722b, through 722n can transform the information of each input node by applying activation functions to the information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to identify objects in images, the neural network 700 can be trained using training data that includes both images and labels. For instance, training images can be input into the network, with each training image having a label indicating the classes of the one or more objects in each image (basically, indicating to the network what the objects are and what features they have). In various aspects, a training image can include an image of a number 2, in which case the label for the image can be [0 0 1 0 0 0 0 0 0 0].

In some cases, the neural network 700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. An example of a CNN is described below with respect to FIG. 8. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
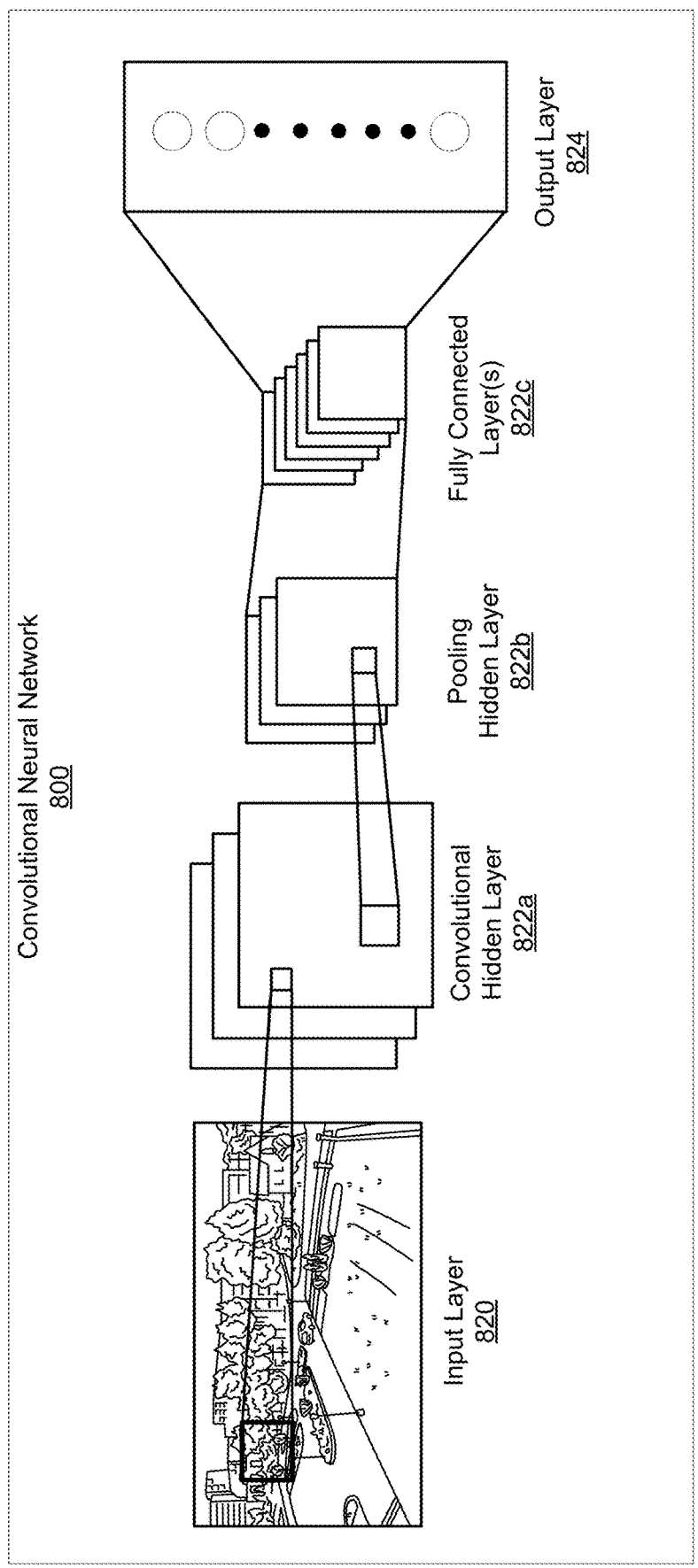
FIG. 8 is a block diagram illustrating an example of a convolutional neural network, in accordance with some examples.

FIG. 8 is an illustrative example of a convolutional neural network 800 (CNN 800). The input layer 820 of the CNN 800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In some aspects, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. In various aspects, a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822c and the pooling hidden layer 822b to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In various aspects, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
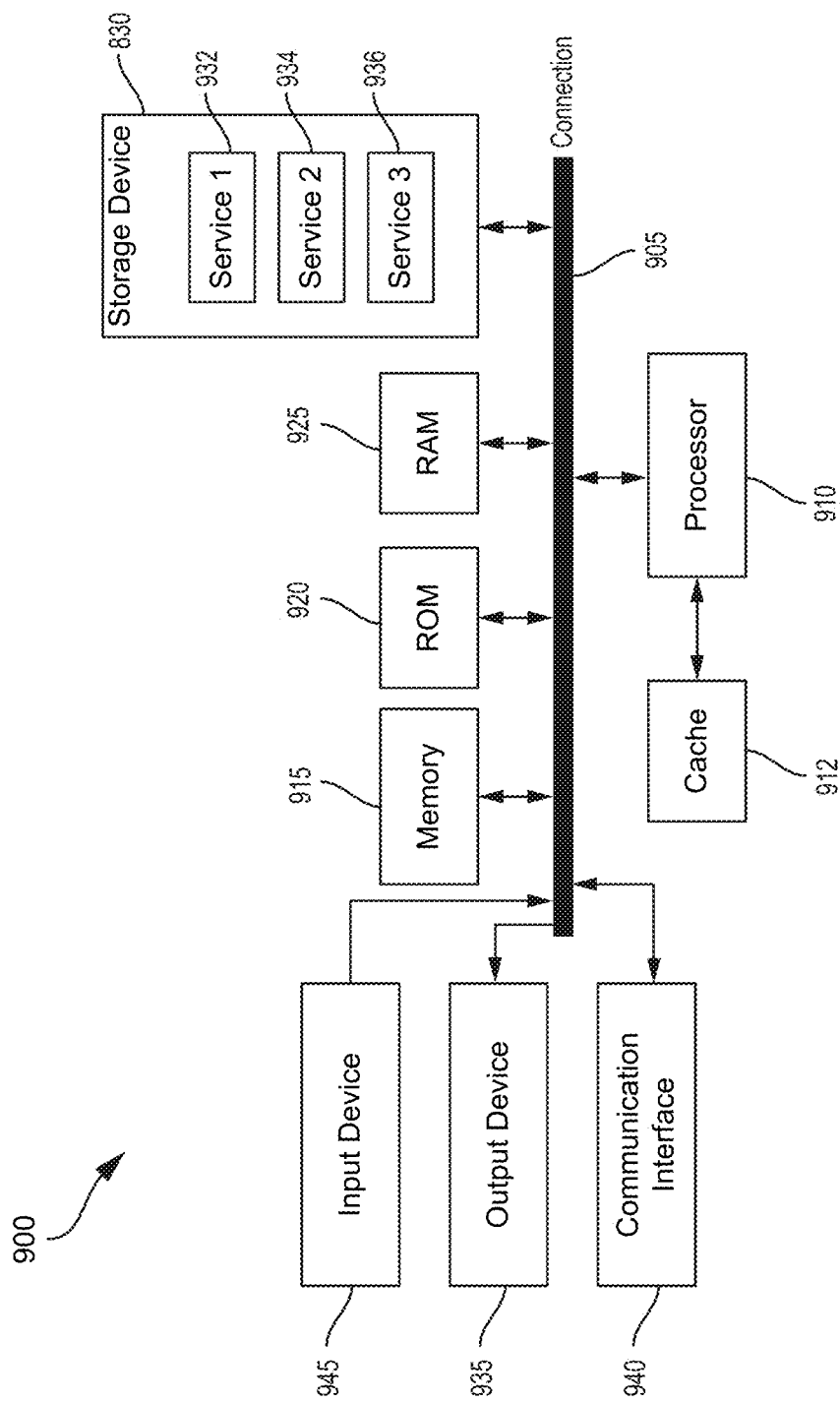
FIG. 9 is a diagram illustrating an example system architecture for implementing certain aspects described herein.

FIG. 9 is a diagram illustrating an example of a system for implementing certain aspects of the present disclosure. In particular, FIG. 9 illustrates an example of a computing system 900, which can be for example any computing device making up a computing system, a camera system, or any component thereof in which the components of the system are in communication with each other using connection 905. The connection 905 can be a physical connection using a bus, or a direct connection into a processor 910, such as in a chipset architecture. The connection 905 can also be a virtual connection, networked connection, or logical connection.

In some examples, the computing system 900 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

A shown, the system 900 includes the processor 910 (e.g., including at least one processing unit, such as a central processing unit (CPU)) and the connection 905 that couples various system components including a system memory 915, such as read-only memory (ROM) 920 and random access memory (RAM) 925, to the processor 910. The computing system 900 can include a cache 912 of high-speed memory connected directly with, in close proximity to, or integrated as part of the processor 910.

The processor 910 can include any general purpose processor and a hardware service or software service, such as services 932, 934, and 936 stored in storage device 930, configured to control processor 910 as well as a special-purpose processor where software instructions are incorporated into the actual processor design. In some aspects, the processor 910 may be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms. In some instances, multimodal systems can enable a user to provide multiple types of input/output to communicate with the computing system 900. The computing system 900 can include a communications interface 940, which can generally govern and manage the user input and system output.

The communication interface 940 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

In some cases, the storage device 930 can be a non-volatile and/or non-transitory and/or computer-readable memory device. In some examples, the storage device 930 can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as the processor 910, the connection 905, the output device 935, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to" and/or "at least one processor being configured to" indicates that one processor or multiple processors (in any combination) satisfy the claim. For example, claim language reciting "at least one processor configured to: X, Y, Z" means a single processor could be used to perform X, Y, and Z; or that multiple processors are each tasked with a certain subset of X, Y, and Z such that together the multiple processors perform X, Y, and Z; or that a group of multiple processors work together to perform X, Y, and Z. In another example, claim language reciting "at least one processor configured to: X, Y, Z" can mean that any single processor may only perform at least a subset of X, Y, and Z.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for generating disparity information from two or more images, the apparatus comprising: at least one memory; and at least one processor coupled to the at least one memory, the at least one processor being configured to: obtain first disparity information corresponding to a pair of images, the pair of images including a first image of a scene and a second image of the scene; obtain confidence information associated with the first disparity information; process, using a machine learning network, the first disparity information and the confidence information to generate second disparity information corresponding to the pair of images; and combine, based on the confidence information, the first disparity information with the second disparity information to generate a refined disparity map corresponding to the pair of images.

Aspect 2. The apparatus of Aspect 1, wherein the pair of images is a stereoscopic image pair including a left view of the scene and a right view of the scene.

Aspect 3. The apparatus of any of Aspects 1 to 2, wherein, to generate the refined disparity map, the at least one processor is configured to: fuse the first disparity information with the confidence information to generate a first fused disparity map; fuse the second disparity information with a complement of the confidence information to generate a second fused disparity map; and combine the first fused disparity map and the second fused disparity map to generate the refined disparity map.

Aspect 4. The apparatus of Aspect 3, wherein: the confidence information includes a confidence map comprising a plurality of locations having a resolution, each location of the plurality of locations including a confidence value representing a respective confidence value of a disparity prediction having a corresponding location in the first disparity information; and the complement of the confidence information comprises a plurality of locations having the resolution, each location of the plurality of locations including a value determined as one minus the respective confidence value having a corresponding location in the confidence map.

Aspect 5. The apparatus of any of Aspects 1 to 4, wherein: the first disparity information is an estimated disparity map including a plurality of estimated disparity values, each respective estimated disparity value of the plurality of estimated disparity values associated with a particular location of a plurality of locations in the estimated disparity map; and the second disparity information is a predicted disparity map including a plurality of predicted disparity values, each respective predicted disparity value of the plurality of predicted disparity values associated with a particular location of a plurality of locations in the predicted disparity map.

Aspect 6. The apparatus of Aspect 5, wherein: the plurality of locations in the estimated disparity map is the same as the plurality of locations in the predicted disparity map; and the respective predicted disparity value associated with the particular location in the predicted disparity map corresponds to the respective estimated disparity value associated with the particular location in the estimated disparity map.

Aspect 7. The apparatus of any of Aspects 5 to 6, wherein the at least one processor is configured to: generate the respective predicted disparity value associated with the particular location based on using the machine learning network to refine the respective estimated disparity value associated with the particular location.

Aspect 8. The apparatus of any of Aspects 1 to 7, wherein: the first disparity information comprises a depth-from-stereo (DFS) disparity map generated based on feature matching between the first image and the second image; and the second disparity information comprises a predicted disparity map generated based on the DFS disparity map, the confidence information, and at least one of the first image or the second image.

Aspect 9. The apparatus of any of Aspects 1 to 8, wherein the machine learning network is a neural network trained to generate a refined disparity map corresponding to an input disparity map.

Aspect 10. The apparatus of any of Aspects 1 to 9, wherein: each of the first image and the second image includes a plurality of pixels having a resolution; the first disparity information includes an estimated disparity map for the pair of images, the estimated disparity map comprising a plurality of locations having the resolution; the confidence information includes a confidence map corresponding to the estimated disparity map, the confidence map comprising a plurality of locations having the resolution; and the second disparity information includes a predicted disparity map for the pair of images, the predicted disparity map comprising a plurality of locations having the resolution.

Aspect 11. The apparatus of Aspect 10, wherein: each location of a plurality of locations in the refined disparity map includes a fused disparity value representing a weighted combination of a respective estimated disparity value having a corresponding location in the estimated disparity map and a respective predicted disparity value having a corresponding location in the predicted disparity map; and the weighted combination is based on a respective confidence value having a corresponding location in the confidence map.

Aspect 12. The apparatus of Aspect 11, wherein the at least one processor is configured to determine the weighted combination based on weighting the respective estimated disparity value by the respective confidence value and weighting the respective predicted disparity value by one minus the respective confidence value.

Aspect 13. The apparatus of any of Aspects 1 to 12, wherein, to obtain the confidence information, the at least one processor is configured to: obtain a plurality of features corresponding to the pair of images; process the plurality of features and the first disparity information to determine one or more locations included in the first disparity information corresponding to a respective one or more occluded regions of the pair of images; and generate a respective confidence value for each location of a plurality of locations included in the confidence information, wherein the respective confidence value is based on whether each location corresponds to the one or more occluded regions.

Aspect 14. The apparatus of Aspect 13, wherein, to obtain the confidence information, the at least one processor is further configured to: determine a left-to-right disparity map between the first and second images of the pair of images, using the first image as an anchor image for the first disparity map; determine a right-to-left disparity map between the first and second images of the pair of images, using the second image as an anchor image for the second disparity map; and process the left-to-right disparity map and the right-to-left disparity map to generate left-right consistency information indicative of one or more valid locations included in the first disparity information and one or more invalid locations included in the first disparity information.

Aspect 15. The apparatus of Aspect 14, wherein the at least one processor is further configured to: generate the respective confidence value further based on whether each location corresponds to a valid or invalid location included in the first disparity information.

Aspect 16. A method generating disparity information from two or more images, comprising: obtaining first disparity information corresponding to a pair of images, the pair of images including a first image of a scene and a second image of the scene; obtaining confidence information associated with the first disparity information; processing, using a machine learning network, the first disparity information and the confidence information to generate second disparity information corresponding to the pair of images; and combining, based on the confidence information, the first disparity information with the second disparity information to generate a refined disparity map corresponding to the pair of images.

Aspect 17. The method of Aspect 16, wherein the pair of images is a stereoscopic image pair including a left view of the scene and a right view of the scene.

Aspect 18. The method of any of Aspects 16 to 17, wherein generating the refined disparity map comprises: fusing the first disparity information with the confidence information to generate a first fused disparity map; fusing the second disparity information with a complement of the confidence information to generate a second fused disparity map; and combining the first fused disparity map and the second fused disparity map to generate the refined disparity map.

Aspect 19. The method of Aspect 18, wherein: the confidence information includes a confidence map comprising a plurality of locations having a resolution, each location of the plurality of locations including a confidence value representing a respective confidence value of a disparity prediction having a corresponding location in the first disparity information; and the complement of the confidence information comprises a plurality of locations having the resolution, each location of the plurality of locations including a value determined as one minus the respective confidence value having a corresponding location in the confidence map.

Aspect 20. The method of any of Aspects 16 to 19, wherein: the first disparity information is an estimated disparity map including a plurality of estimated disparity values, each respective estimated disparity value of the plurality of estimated disparity values associated with a particular location of a plurality of locations in the estimated disparity map; and the second disparity information is a predicted disparity map including a plurality of predicted disparity values, each respective predicted disparity value of the plurality of predicted disparity values associated with a particular location of a plurality of locations in the predicted disparity map.

Aspect 21. The method of Aspect 20, wherein: the plurality of locations in the estimated disparity map is the same as the plurality of locations in the predicted disparity map; and the respective predicted disparity value associated with the particular location in the predicted disparity map corresponds to the respective estimated disparity value associated with the particular location in the estimated disparity map.

Aspect 22. The method of any of Aspects 20 to 21, further comprising: generating the respective predicted disparity value associated with the particular location based on using the machine learning network to refine the respective estimated disparity value associated with the particular location.

Aspect 23. The method of any of Aspects 16 to 22, wherein: the first disparity information comprises a depth-from-stereo (DFS) disparity map generated based on feature matching between the first image and the second image; and the second disparity information comprises a predicted disparity map generated based on the DFS disparity map, the confidence information, and at least one of the first image or the second image.

Aspect 24. The method of any of Aspects 16 to 23, wherein the machine learning network is a neural network trained to generate a refined disparity map corresponding to an input disparity map.

Aspect 25. The method of any of Aspects 16 to 24, wherein: each of the first image and the second image includes a plurality of pixels having a resolution; the first disparity information includes an estimated disparity map for the pair of images, the estimated disparity map comprising a plurality of locations having the resolution; the confidence information includes a confidence map corresponding to the estimated disparity map, the confidence map comprising a plurality of locations having the resolution; and the second disparity information includes a predicted disparity map for the pair of images, the predicted disparity map comprising a plurality of locations having the resolution.

Aspect 26. The method of Aspect 25, wherein: each location of a plurality of locations in the refined disparity map includes a fused disparity value representing a weighted combination of a respective estimated disparity value having a corresponding location in the estimated disparity map and a respective predicted disparity value having a corresponding location in the predicted disparity map; and the weighted combination is based on a respective confidence value having a corresponding location in the confidence map.

Aspect 27. The method of Aspect 26, further comprising determining the weighted combination based on weighting the respective estimated disparity value by the respective confidence value and weighting the respective predicted disparity value by one minus the respective confidence value.

Aspect 28. The method of any of Aspects 16 to 27, wherein obtaining the confidence information comprises: obtaining a plurality of features corresponding to the pair of images; processing the plurality of features and the first disparity information to determine one or more locations included in the first disparity information corresponding to a respective one or more occluded regions of the pair of images; and generating a respective confidence value for each location of a plurality of locations included in the confidence information, wherein the respective confidence value is based on whether each location corresponds to the one or more occluded regions.

Aspect 29. The method of Aspect 28, wherein obtaining the confidence information comprises: determining a left-to-right disparity map between the first and second images of the pair of images, using the first image as an anchor image for the first disparity map; determining a right-to-left disparity map between the first and second images of the pair of images, using the second image as an anchor image for the second disparity map; and processing the left-to-right disparity map and the right-to-left disparity map to generate left-right consistency information indicative of one or more valid locations included in the first disparity information and one or more invalid locations included in the first disparity information.

Aspect 30. The method of Aspect 29, further comprising: generating the respective confidence value further based on whether each location corresponds to a valid or invalid location included in the first disparity information.

Aspect 31. A computer-readable medium storing instructions that, when executed by one or more processors, cause the one or more processors to perform operations according to any of Aspects 1 to 15.

Aspect 32. A computer-readable medium storing instructions that, when executed by one or more processors, cause the one or more processors to perform operations according to any of Aspects 16 to 30.

Aspect 33. An apparatus comprising one or more means for performing operations according to any of Aspects 1 to 15.

Aspect 34. An apparatus comprising one or more means for performing operations according to any of Aspects 16 to 30.

What is claimed is:

1. An apparatus for generating disparity information from two or more images, the apparatus comprising:
   at least one memory; and
   at least one processor coupled to the at least one memory, the at least one processor being configured to:
   obtain first disparity information corresponding to a pair of images, the pair of images including a first image of a scene and a second image of the scene, wherein the first disparity information comprises an estimated disparity map between the first and second images;
   obtain confidence information associated with the first disparity information;
   generate second disparity information corresponding to the pair of images, wherein the second disparity information comprises an initial refinement of the first disparity information based on the confidence information, and wherein the second disparity information is generated as an output prediction of a disparity refinement machine learning network configured to process the first disparity information and the confidence information as inputs; and
   combine, based on the confidence information, the first disparity information with the second disparity information to generate a refined disparity map corresponding to the pair of images, wherein the refined disparity map comprises a weighted combination of the estimated disparity map and the initial refinement according to the confidence information.

2. The apparatus of claim 1, wherein the pair of images is a stereoscopic image pair including a left view of the scene and a right view of the scene.

3. The apparatus of claim 1, wherein, to generate the refined disparity map, the at least one processor is configured to:
fuse the first disparity information with the confidence information to generate a first fused disparity map;
fuse the second disparity information with a complement of the confidence information to generate a second fused disparity map; and
combine the first fused disparity map and the second fused disparity map to generate the refined disparity map.

4. The apparatus of claim 3, wherein:
the confidence information includes a confidence map comprising a plurality of locations having a resolution, each location of the plurality of locations including a confidence value representing a respective confidence value of a disparity prediction having a corresponding location in the first disparity information; and
the complement of the confidence information comprises a plurality of locations having the resolution, each location of the plurality of locations including a value determined as one minus the respective confidence value having a corresponding location in the confidence map.

5. The apparatus of claim 1, wherein:
the first disparity information is the estimated disparity map and wherein the estimated disparity map includes a plurality of estimated disparity values, each respective estimated disparity value of the plurality of estimated disparity values associated with a particular location of a plurality of locations in the estimated disparity map; and
the second disparity information is a predicted disparity map including a plurality of predicted disparity values, each respective predicted disparity value of the plurality of predicted disparity values associated with a particular location of a plurality of locations in the predicted disparity map.

6. The apparatus of claim 5, wherein:
the plurality of locations in the estimated disparity map is the same as the plurality of locations in the predicted disparity map; and
the respective predicted disparity value associated with the particular location in the predicted disparity map corresponds to the respective estimated disparity value associated with the particular location in the estimated disparity map.

7. The apparatus of claim 5, wherein the at least one processor is configured to:
generate the respective predicted disparity value associated with the particular location based on using the machine learning network to refine the respective estimated disparity value associated with the particular location.

8. The apparatus of claim 1, wherein:
the first disparity information comprises a depth-from-stereo (DFS) disparity map generated based on feature matching between the first image and the second image; and
the second disparity information comprises a predicted disparity map generated based on the DFS disparity map, the confidence information, and at least one of the first image or the second image.

9. The apparatus of claim 1, wherein the machine learning network is a neural network trained to generate a refined disparity map corresponding to an input disparity map.

10. The apparatus of claim 1, wherein:
each of the first image and the second image includes a plurality of pixels having a resolution;
the first disparity information includes the estimated disparity map for the pair of images, the estimated disparity map comprising a plurality of locations having the resolution;
the confidence information includes a confidence map corresponding to the estimated disparity map, the confidence map comprising a plurality of locations having the resolution; and
the second disparity information includes a predicted disparity map for the pair of images, the predicted disparity map comprising a plurality of locations having the resolution.

11. The apparatus of claim 10, wherein:
each location of a plurality of locations in the refined disparity map includes a fused disparity value representing a weighted combination of a respective estimated disparity value having a corresponding location in the estimated disparity map and a respective predicted disparity value having a corresponding location in the predicted disparity map; and
the weighted combination is based on a respective confidence value having a corresponding location in the confidence map.

12. The apparatus of claim 11, wherein the at least one processor is configured to determine the weighted combination based on weighting the respective estimated disparity value by the respective confidence value and weighting the respective predicted disparity value by one minus the respective confidence value.

13. The apparatus of claim 1, wherein, to obtain the confidence information, the at least one processor is configured to:
obtain a plurality of features corresponding to the pair of images;
process the plurality of features and the first disparity information to determine one or more locations included in the first disparity information corresponding to a respective one or more occluded regions of the pair of images; and
generate a respective confidence value for each location of a plurality of locations included in the confidence information, wherein the respective confidence value is based on whether each location corresponds to the one or more occluded regions.

14. The apparatus of claim 13, wherein, to obtain the confidence information, the at least one processor is further configured to:
determine a left-to-right disparity map between the first and second images of the pair of images, using the first image as an anchor image for the first disparity map;
determine a right-to-left disparity map between the first and second images of the pair of images, using the second image as an anchor image for the second disparity map; and
process the left-to-right disparity map and the right-to-left disparity map to generate left-right consistency information indicative of one or more valid locations included in the first disparity information and one or more invalid locations included in the first disparity information.

15. The apparatus of claim 14, wherein the at least one processor is further configured to:
generate the respective confidence value further based on whether each location corresponds to a valid or invalid location included in the first disparity information.

16. A method generating disparity information from two or more images, comprising:
obtaining first disparity information corresponding to a pair of images, the pair of images including a first image of a scene and a second image of the scene, wherein the first disparity information comprises an estimated disparity map between the first and second images;
obtaining confidence information associated with the first disparity information;
generating second disparity information corresponding to the pair of images, wherein the second disparity information comprises an initial refinement of the first disparity information based on the confidence information, and wherein the second disparity information is generated as an output prediction of a disparity refinement machine learning network configured to process the first disparity information and the confidence information as inputs; and
combining, based on the confidence information, the first disparity information with the second disparity information to generate a refined disparity map corresponding to the pair of images, wherein the refined disparity map comprises a weighted combination of the estimated disparity map and the initial refinement according to the confidence information.

17. The method of claim 16, wherein the pair of images is a stereoscopic image pair including a left view of the scene and a right view of the scene.

18. The method of claim 16, wherein generating the refined disparity map comprises:
fusing the first disparity information with the confidence information to generate a first fused disparity map;
fusing the second disparity information with a complement of the confidence information to generate a second fused disparity map; and
combining the first fused disparity map and the second fused disparity map to generate the refined disparity map.

19. The method of claim 18, wherein:
the confidence information includes a confidence map comprising a plurality of locations having a resolution, each location of the plurality of locations including a confidence value representing a respective confidence value of a disparity prediction having a corresponding location in the first disparity information; and
the complement of the confidence information comprises a plurality of locations having the resolution, each location of the plurality of locations including a value determined as one minus the respective confidence value having a corresponding location in the confidence map.

20. The method of claim 16, wherein:
the first disparity information is the estimated disparity map and wherein the estimated disparity map includes a plurality of estimated disparity values, each respective estimated disparity value of the plurality of estimated disparity values associated with a particular location of a plurality of locations in the estimated disparity map; and
the second disparity information is a predicted disparity map including a plurality of predicted disparity values, each respective predicted disparity value of the plurality of predicted disparity values associated with a particular location of a plurality of locations in the predicted disparity map.

21. The method of claim 20, wherein:
the plurality of locations in the estimated disparity map is the same as the plurality of locations in the predicted disparity map; and
the respective predicted disparity value associated with the particular location in the predicted disparity map corresponds to the respective estimated disparity value associated with the particular location in the estimated disparity map.

22. The method of claim 20, further comprising:
generating the respective predicted disparity value associated with the particular location based on using the machine learning network to refine the respective estimated disparity value associated with the particular location.

23. The method of claim 16, wherein:
the first disparity information comprises a depth-from-stereo (DFS) disparity map generated based on feature matching between the first image and the second image; and
the second disparity information comprises a predicted disparity map generated based on the DFS disparity map, the confidence information, and at least one of the first image or the second image.

24. The method of claim 16, wherein the machine learning network is a neural network trained to generate a refined disparity map corresponding to an input disparity map.

25. The method of claim 16, wherein:
each of the first image and the second image includes a plurality of pixels having a resolution;
the first disparity information includes the estimated disparity map for the pair of images, the estimated disparity map comprising a plurality of locations having the resolution;
the confidence information includes a confidence map corresponding to the estimated disparity map, the confidence map comprising a plurality of locations having the resolution; and
the second disparity information includes a predicted disparity map for the pair of images, the predicted disparity map comprising a plurality of locations having the resolution.

26. The method of claim 25, wherein:
each location of a plurality of locations in the refined disparity map includes a fused disparity value representing a weighted combination of a respective estimated disparity value having a corresponding location in the estimated disparity map and a respective predicted disparity value having a corresponding location in the predicted disparity map; and
the weighted combination is based on a respective confidence value having a corresponding location in the confidence map.

27. The method of claim 26, further comprising determining the weighted combination based on weighting the respective estimated disparity value by the respective confidence value and weighting the respective predicted disparity value by one minus the respective confidence value.

28. The method of claim 16, wherein obtaining the confidence information comprises:
obtaining a plurality of features corresponding to the pair of images;

processing the plurality of features and the first disparity information to determine one or more locations included in the first disparity information corresponding to a respective one or more occluded regions of the pair of images; and generating a respective confidence value for each location of a plurality of locations included in the confidence information, wherein the respective confidence value is based on whether each location corresponds to the one or more occluded regions.

29. The method of claim 28, wherein obtaining the confidence information comprises:

determining a left-to-right disparity map between the first and second images of the pair of images, using the first image as an anchor image for the first disparity map;

determining a right-to-left disparity map between the first and second images of the pair of images, using the second image as an anchor image for the second disparity map; and processing the left-to-right disparity map and the right-to-left disparity map to generate left-right consistency information indicative of one or more valid locations included in the first disparity information and one or more invalid locations included in the first disparity information.

30. The method of claim 29, further comprising:

generating the respective confidence value further based on whether each location corresponds to a valid or invalid location included in the first disparity information.

\* \* \* \* \*